United States Patent [19]
Costanzo

[11] 3,768,089
[45] Oct. 23, 1973

[54] JACK STRIP GAGE

[75] Inventor: James Joseph Costanzo, River Grove, Ill.

[73] Assignee: GTE Automatic Electric Laboratories Incorporated, Northlake, Ill.

[22] Filed: May 18, 1972

[21] Appl. No.: 254,683

[52] U.S. Cl. .......................... 340/282 R, 340/248 R
[51] Int. Cl. ...................... C08b 13/00, C08b 21/00
[58] Field of Search ..................... 340/282 R, 248 R

[56] References Cited
UNITED STATES PATENTS
3,211,850  10/1965  Toepfer ..................... 340/282 X Primary Examiner—Harold I. Pitts
Attorney—K. Mullerheim et al.

[57] ABSTRACT

A device to test the adequacy of the retaining power of a plug jack wherein a conductive, spring loaded plunger provides an outward force of a selected level which tends to withdraw a plug from the jack being tested. When the jack retaining power is inadequate the conductive plunger opens an electrical circuit to thereby indicate a jack failure.

6 Claims, 1 Drawing Figure

PATENTED OCT 23 1973
3,768,089
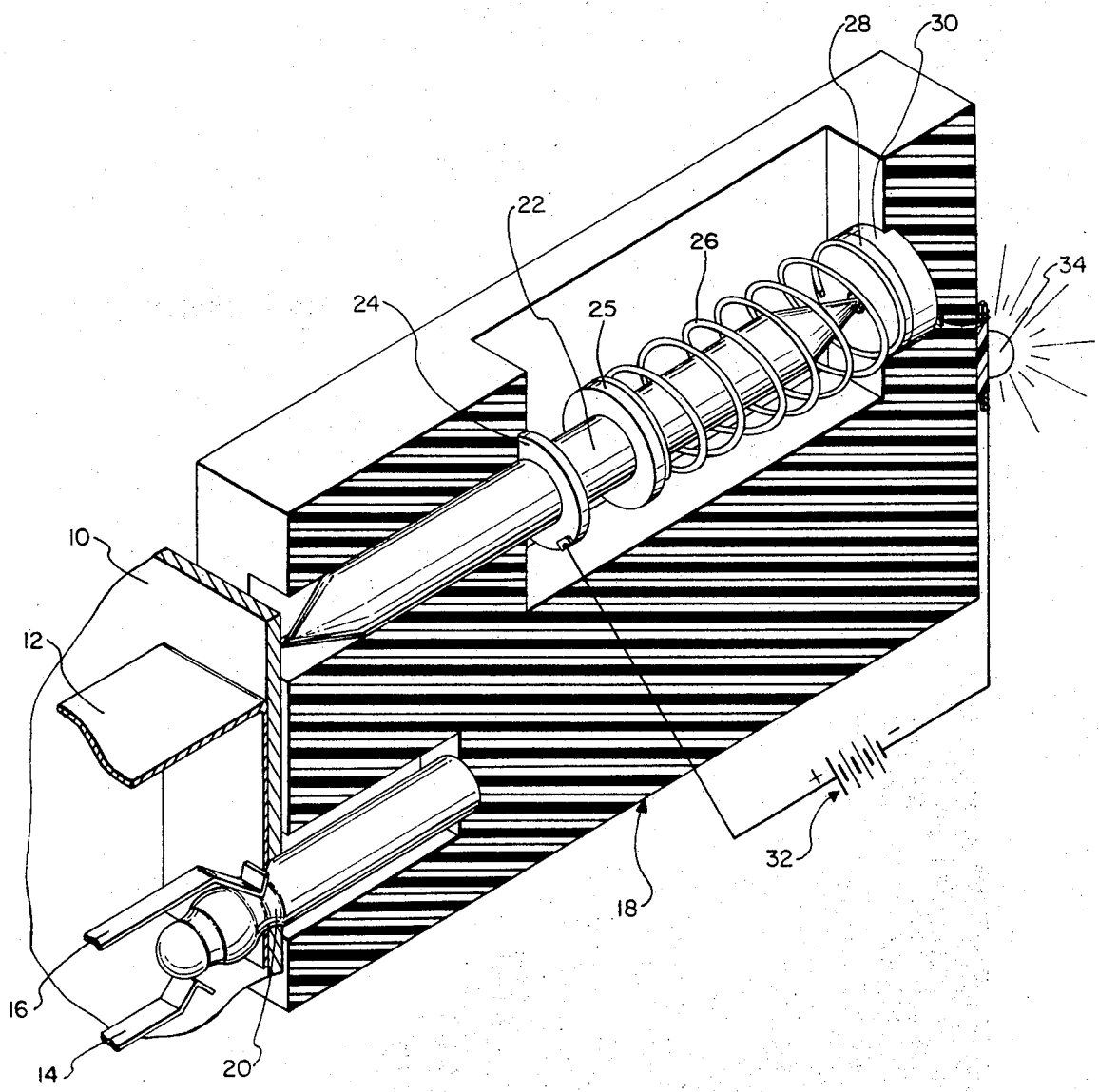

JACK STRIP GAGE

BACKGROUND OF THE INVENTION

1. Field of the Invention

The present invention relates most generally to the field of electrical connectors and more particularly to a device for testing the plug retaining power of plug jacks.

2. Description of the Prior Art

For many years, particularly in the telephone art, the plug and jack have been a common means for connecting two circuits together. The common telephone plug jack typically has a tip spring contact and a ring spring contact each of which engages a corresponding portion of the plug. In order to operate properly there usually must be a differential tension on the tip and ring springs which tends to pull the plug into reliable contact with the sleeve into which the plug is inserted and hold it tightly against the front of the jack panal. If the tip and ring springs are improperly adjusted the plug will tend to be pushed out of the jack.

Various means have been developed to gauge the tension of the jack spring contacts during the production of jack strips. Representative of such devices is the apparatus for gauging jacks described in U.S. Pat. No. 2,483,867 which issued to C. W. Anderson et al. on Oct. 4, 1949. That apparatus is a measuring device used to indicate whether or not spring tension is within given limits and to effect a tension adjustment when necessary. This type of device, while applicable to the testing of jack strips during their production, is, unfortunately, not generally applicable to the field testing of jacks in an operating system.

OBJECTS AND SUMMARY OF THE INVENTION

From the preceding discussion it will be understood that among the various objectives of the present invention are included the following:

the provision of a new and improved jack gauge;

the provision of a device of the above-described character which is a portable, self-contained unit;

the provision of a device of the above-described character which is adaptable to test a variety of different types of jacks; and the provision of a device of the above-described character including means for indicating a faulty jack.

These and other objects of the present invention are efficiently achieved by providing an electrically inert plug of a selected configuration affixed to a supporting body which contains an outwardly spring biased, electrically conductive plunger. When the plug is properly inserted in the jack under test the spring biased plunger completes an electrical indicating circuit. If the plug is withdrawn from the jack by the spring biased plunger the indicating circuit is opened to thereby indicate a faulty jack.

The foregoing as well as other objects, features and advantages of the present invention will become more clearly understood from the following detailed description taken in conjunction with the appended drawing.

BRIEF DESCRIPTION OF THE DRAWING

The single appended FIGURE is a schematic illustration of a plug jack testing device constructed in accordance with the principles of the present invention.

DESCRIPTION OF PREFERRED EMBODIMENT

Turning now to the appended FIGURE there is schematically shown a jack panel 10 in which there is mounted a jack including a sleeve lead 12, a tip spring contact 14 and a ring spring contact 16. It is the differential tension between the spring contacts 14 and 16 which must hold a plug snugly against the jack panel 10 in order to maintain reliable circuit continuity.

The testing device of the present invention includes a support body 18 which may conveniently be molded from any of a variety of plastic materials. A phone plug 20 is mounted to one end of the support body 18 such as to extend beyond the face thereof by whatever distance is conventional for the particular plug. It will be noted that, although the plug 20 may be of usual construction, it is electrically inert in that no electrical connections are made thereto. Also mounted in the support body 18 is an electrically conductive plunger 22 which is slidably disposed through a conductive washer 24. The plunger 22 is provided with a shoulder 25 which engages one end of a spring 26. The other end of the spring 26 engages an electrically insulative washer 28 on the surface of an electrical contact pad 30. An indicating circuit including a battery 32 and lamp 34 is coupled in series with the conductive washer 24 and contact pad 30. It will be noted that the construction of the testing device may readily be adapted to provide a convenient recessed mounting and electrical connections for one or more conventional dry cell type batteries in the supporting body 18.

In use the plug 20 is inserted into the jack to be tested thereby pushing the plunger 22 against the spring 26 into electrical contact with the contact pad 30. Electrical current thus flows through the series indicating circuit and conductive plunger 22, lighting the lamp 34 thereby indicating that the plug 20 is properly seated in the jack. With a properly constructed jack the plug 20 will be retained in the jack and the lamp 34 will remain lighted. If, however, the retaining power of the jack is inadequate due to faulty construction or adjustment, the plug 20 will tend to be withdrawn by the outwardly spring biased plunger 22. As the plug 20 is withdrawn the plunger 22 is pushed outwardly against the jack panel 10, breaking electrical contact with the contact pad 30, thus interruptiong the indicating circuit and extinguishing the lamp 34.

It will be understood that although the invention has been described with reference to the conventional telephone jack and plug, it is readily adaptable to the testing of any type of plug jack by merely changing the plug type. Further, it will be clear that the amount of outward spring bias provided may also conveniently be varied by either threading the spring engaging shoulder 24 on the plunger 22 such that its position may be adjusted longitudinally or by providing a screw type longitudinal adjustment for the insulative washer 28 against which the spring 26 works. Finally, the amount of plug withdrawal which indicates a faulty jack may also be adjusted by providing a longitudinal adjustment for the contact pad 30.

From the foregoing description it will be seen that the Applicant has provided a new and novel plug jack testing device whereby the objectives set forth hereinabove are efficiently achieved. Since certain changes in the above-described construction will occur to those skilled in the art without departure from the scope of the invention it is intended that all matter set forth in the description or shown in the appended drawing shall be interpreted as illustrative and not in a limiting sense.

Having described what is new and novel and desired to secure by Letters Patent, what is claimed is:

1. Apparatus for testing and indicating the adequacy of the plug retaining power of a plug jack, said apparatus comprising
   a supporting body,
   a plug mounted to said supporting body and being of a selected configuration adapted for insertion in said jack,
   means mounted in said supporting body for exerting an outward biasing force of a preselected level thereon tending to withdraw said plug from said jack, and
   an indicating circuit disposed in said supporting body and cooperating with said biasing force means to produce a signal when said plug is withdrawn from said jack by a preselected amount.

2. Apparatus as recited in claim 1 wherein said biasing force means comprises
   a plunger slidably disposed through said supporting body on an axis substantially parallel to that of said plug,
   a biasing spring engaging said supporting body and said plunger such as to be under compression when said plunger is disposed within said supporting body.

3. Apparatus as recited in claim 2 further including a circumferential spring engaging shoulder disposed at a selected longitudinal position on said plunger, and wherein
   said biasing spring is a coil spring disposed about said plunger, having one end engaging said shoulder and the other end engaging said supporting body.

4. Apparatus as recited in claim 2 wherein
   said supporting body is formed of an electrically insulative material,
   said slidable plunger is formed of an electrically conductive material, and
   said indicating circuit comprises a voltage supply coupled at one side to said conductive plunger, an indicating means coupled to the other side of said voltage supply, and electrical contact means mounted on said supporting body in axial alignment with said plunger and coupled to said indicating means such that electrical current from said voltage supply flows through said indicating means only when said conductive plunger is withdrawn into said supporting body and electrically continuous with said contact means.

5. Apparatus as recited in claim 4 further including a second electrical contact means mounted on said supporting body, having an aperture therethrough adapted to slidably receive and electrically contact said conductive plunger, and being coupled to said voltage supply.

6. Apparatus as recited in claim 3 wherein
   the position of said spring engaging shoulder is adjustable along the longitudinal axis of said plunger to thereby adjust the level of said outward biasing force.

* * * * *